(12) United States Patent
Yu et al.

US010879525B2

(10) Patent No.: US 10,879,525 B2
(45) Date of Patent: Dec. 29, 2020

(54) METHOD OF MAKING STRETCHABLE COMPOSITE ELECTRODE

(71) Applicants: Tsinghua University, Beijing (CN); HON HAI PRECISION INDUSTRY CO., LTD., New Taipei (TW)

(72) Inventors: Yang Yu, Beijing (CN); Jia-Ping Wang, Beijing (CN); Kai-Li Jiang, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 111 days.

(21) Appl. No.: 16/379,278

(22) Filed: Apr. 9, 2019

(65) Prior Publication Data
US 2020/0006755 A1    Jan. 2, 2020

(30) Foreign Application Priority Data

Jun. 29, 2018  (CN) .......................... 2018 1 0711909

(51) Int. Cl.
| H01M 4/1393 | (2010.01) |
| H01M 4/133 | (2010.01) |
| H01M 10/0525 | (2010.01) |
| H01M 4/583 | (2010.01) |
| H01M 4/02 | (2006.01) |

(52) U.S. Cl.
CPC ......... *H01M 4/1393* (2013.01); *H01M 4/133* (2013.01); *H01M 4/583* (2013.01); *H01M 10/0525* (2013.01); *H01M 2004/021* (2013.01)

(58) Field of Classification Search
None
See application file for complete search history.

(56) References Cited

U.S. PATENT DOCUMENTS

| 2008/0299460 | A1 | 12/2008 | Feng et al. |
| 2010/0047522 | A1 | 2/2010 | Sivarajan et al. |
| 2011/0096465 | A1 | 4/2011 | Zhou et al. |
| 2011/0097512 | A1 | 4/2011 | Zhou et al. |
| 2011/0108545 | A1 | 5/2011 | Wang et al. |
| 2011/0256451 | A1 | 10/2011 | Cui et al. |
| 2013/0045413 | A1 | 2/2013 | Wang et al. |
| 2013/0146215 | A1 | 6/2013 | Liu et al. |
| 2013/0284695 | A1 | 10/2013 | Feng et al. |

(Continued)

FOREIGN PATENT DOCUMENTS

| CN | 1357899 | 7/2002 |
| CN | 101315974 A | 12/2008 |

(Continued)

OTHER PUBLICATIONS

Machine Translation of CN108155387 (Year: 2018).*

*Primary Examiner* — Wyatt P McConnell
(74) *Attorney, Agent, or Firm* — ScienBiziP, P.C.

(57) ABSTRACT

A method of making a stretchable composite electrode is provided. An elastic substrate is pre-stretched along a first direction and a second direction, to obtain a pre-stretched elastic substrate. A carbon nanotube active material composite layer is laid on a surface of the pre-stretched elastic substrate. And the pre-stretching of the elastic substrate is removed, and a plurality of wrinkles is formed on a surface of the carbon nanotube active material composite layer.

15 Claims, 20 Drawing Sheets

(56) References Cited

U.S. PATENT DOCUMENTS

| | | |
|---|---|---|
| 2014/0175087 A1 | 6/2014 | Feng et al. |
| 2015/0207143 A1* | 7/2015 | Wu .................... H01M 4/133 |
| | | 429/231.8 |
| 2018/0026258 A1 | 1/2018 | Yan et al. |

FOREIGN PATENT DOCUMENTS

| | | |
|---|---|---|
| CN | 102103935 | 6/2011 |
| CN | 103159204 | 6/2013 |
| CN | 103903870 | 7/2014 |
| CN | 104538202 | 4/2015 |
| CN | 107565091 | 1/2018 |
| CN | 107611468 | 1/2018 |
| CN | 107644977 | 1/2018 |
| CN | 107747957 | 3/2018 |
| CN | 108155387 A | 6/2018 |
| JP | 2011-088813 | 5/2011 |
| JP | 2011-103293 | 5/2011 |
| JP | 2015-138777 | 7/2015 |
| TW | 201343950 | 11/2013 |

\* cited by examiner providing an elastic substrate, and pre-stretching the elastic substrate along a first direction and a second direction intersecting with the first direction, to obtain a pre-stretched elastic substrate ⸺ S1 laying a carbon nanotube active material composite layer on a surface of the pre-stretched elastic substrate comprising:
　laying a first carbon nanotube film structure on the surface of the pre-stretched elastic substrate, and the first carbon nanotube film structure directly contacting with the pre-stretched elastic substrate and comprising a first plurality of super-aligned carbon nanotube films stacked with each other, each of the first plurality of super-aligned carbon nanotube films comprising a plurality of carbon nanotubes substantially parallel with each other;
　adding an electrode active material to a surface of the first carbon nanotube film structure away from the pre-stretched elastic substrate, to form a first active material layer on the surface of the first carbon nanotube film structure;
　laying a second carbon nanotube film structure on a surface of the first active material layer away from the pre-elastic substrate, to form the carbon nanotube active material composite layer, and the second carbon nanotube film structure being in direct contact with the surface of the first active material layer and comprises a second plurality of super-aligned carbon nanotube films stacked with each other ⸺ S2 releasing the pre-stretching of the elastic substrate to restore deformations of the elastic substrate and form a plurality of wrinkles on a surface of the carbon nanotube active material composite layer ⸺ S3

FIG. 1

METHOD OF MAKING STRETCHABLE COMPOSITE ELECTRODE

CROSS-REFERENCE TO RELATED APPLICATIONS

This application claims all benefits accruing under 35 U.S.C. § 119 from China Patent Application No. 201810711909.6, filed on Jun. 29, 2018, in the China National Intellectual Property Administration, the contents of which are hereby incorporated by reference. The application is also related to copending applications entitled, "STRETCHABLE FILM STRUCTURE AND METHOD OF MAKING THE SAME", filed Ser. No. 16/379,287. The application is also related to copending applications entitled, "STRETCHABLE CAPACITOR ELECTRODE-CONDUCTOR STRUCTURE", filed Ser. No. 16/379,264. The application is also related to copending applications entitled, "STRETCHABLE COMPOSITE ELECTRODE AND STRETCHABLE LITHIUM ION BATTERY USING THE SAME", filed Ser. No. 16/379,264. The application is also related to copending applications entitled, "METHOD FOR MAKING STRETCHABLE CAPACITOR ELECTRODE-CONDUCTOR STRUCTURE", filed Ser. No. 16/379,258.

FIELD

The present disclosure relates to a method of making a stretchable composite electrode.

BACKGROUND

Stretchable composite electrodes are an important part of stretchable electronic devices. In order to be compatible with the working characteristics and working environment of the stretchable electronic devices, the composite electrodes need to not only has excellent electrochemical properties after stretching in different directions, but also has ability to resist repeated stretching in different directions.

Carbon nanotube films have excellent mechanical properties and electrical properties. The carbon nanotube films can be used not only as conductors but also in combination with active materials to obtain composite electrodes with excellent electrical properties.

However, conventional carbon nanotube composite electrodes is stretchable under little stress in a single direction, and can be easily broken when it is repeatedly stretched in different directions at the same time.

Therefore, there is a room for improvement.

BRIEF DESCRIPTION OF THE DRAWINGS

Implementations of the present technology will now be described, by way of example only, with reference to the attached figures, wherein:

FIG. 1 is a flow diagram of one embodiment of a method of making a stretchable composite electrode.

DETAILED DESCRIPTION

Figure 2:
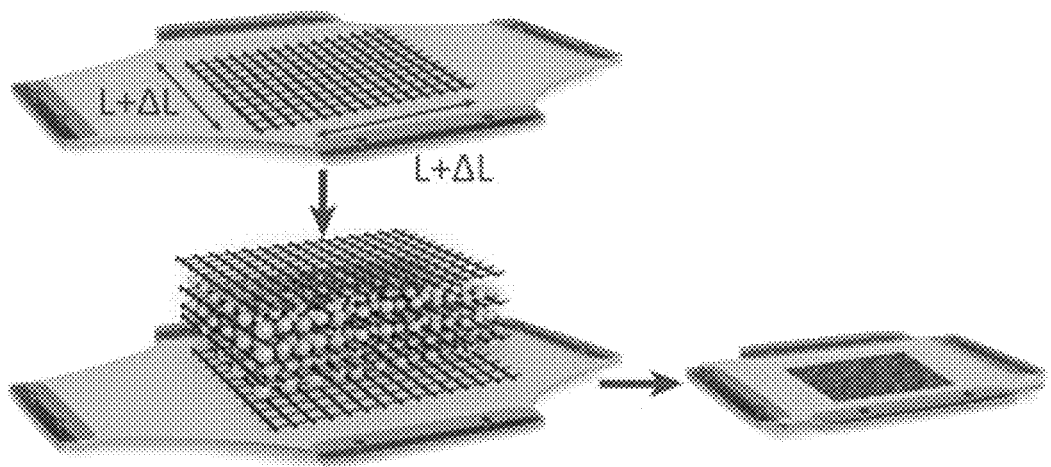
FIG. 2 is a schematic view of the method of making the stretchable composite electrode in FIG. 1.

The disclosure is illustrated by way of example and not by way of limitation in the figures of the accompanying drawings in which like references indicate similar elements. It should be noted that references to "another," "an," or "one" embodiment in this disclosure are not necessarily to the same embodiment, and such references mean "at least one."

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts have been exaggerated to illustrate details and features of the present disclosure better.

Several definitions that apply throughout this disclosure will now be presented.

The term "substantially" is defined to be essentially conforming to the particular dimension, shape, or other feature which is described, such that the component need not be exactly or strictly conforming to such a feature. The term "comprise," when utilized, means "include, but not necessarily limited to"; it specifically indicates open-ended inclusion or membership in the so-described combination, group, series, and the like.

FIG. 1 and FIG. 2 show one embodiment of the present application in relation to a method of making stretchable composite electrodes. The method comprises:

step (S1): providing an elastic substrate, and pre-stretching the elastic substrate along a first direction and a second direction intersecting with the first direction, to obtain a pre-stretched elastic substrate;

step (S2), laying a carbon nanotube active material composite layer on a surface of the pre-stretched elastic substrate, and step (S2) comprising:

step (S21), laying a first carbon nanotube film structure on the surface of the pre-stretched elastic substrate, and the first carbon nanotube film structure directly contacting with the pre-stretched elastic substrate and comprising a first plurality of super-aligned carbon nanotube films stacked with each other, each of the first plurality of super-aligned carbon nanotube films comprising a plurality of carbon nanotubes substantially parallel with each other;

step (S22), adding an electrode active material to a surface of the first carbon nanotube film structure away from the pre-stretched elastic substrate, to form a first active material layer on the surface of the first carbon nanotube film structure;

step (S23), laying a second carbon nanotube film structure on a surface of the first active material layer away from the pre-elastic substrate, to form the carbon nanotube active material composite layer, and the second carbon nanotube film structure being in direct contact with the surface of the first active material layer and comprises a second plurality of super-aligned carbon nanotube films stacked with each other;

step (S3), removing the pre-stretching of the elastic substrate along the first direction and the second direction, to restore the pre-stretched elastic substrate to the elastic substrate and form a plurality of wrinkles on a surface of the carbon nanotube active material composite layer.

In step (S1), an intersection angle of the first direction and the second direction is not limited. In one embodiment, the first direction is perpendicular with the second direction. When the first direction is perpendicular with the second direction, the elastic substrate can be evenly stretched during pre-stretching; and after the pre-stretching is removed, the distribution, size, and shape of the plurality of wrinkles are uniform. Therefore, when the stretchable composite electrode is stretched in any direction, the plurality of wrinkles can be unfolded in a stress direction, and thus an ability of the stretchable composite electrode to resist stretching in different directions is improved.

In some embodiments, the elastic substrate is pre-stretched in three or more directions to make the elastic substrate be in a tensional state, and the three or more directions are symmetrical and intersecting.

A material of the elastic substrate can be selected from silicone rubber, polyvinyl chloride, polytetrafluoroethylene, polyurethane (PU), polyvinyl chloride (PVC), polydimethylsiloxane (PDMS) and the like. In one embodiment, the elastic substrate is a rectangular PDMS substrate with a thickness of 1 mm.

In one embodiment, the elastic substrate is biaxial pre-stretched along each of the first direction the second direction. "Biaxial pre-stretched" refers that the elastic substrate is pre-stretched toward two ends along each of the first direction and the second direction. In one embodiment, the elastic substrate is uniaxial pre-stretched along the first direction and the second direction. "Uniaxial pre-stretched" refers that along each of the first direction and the second direction, one end of the elastic substrate is fixed, and only the other end is pre-stretched. In one embodiment, a shape of the elastic substrate is a rectangle, the elastic substrate is biaxial pre-stretched both along the first direction and the second direction, the first direction is parallel to a long side of the rectangle, and the second direction is parallel with a short side of the rectangle.

In one embodiment, a first pre-stretching amount of the elastic substrate along the first direction is equal to a second pre-stretching amount of the elastic substrate along the second direction. The first pre-stretching amount refers a percentage of a length of the elastic substrate along the first direction after pre-stretching and a length of the elastic substrate along the first direction before pre-stretching. The second pre-stretching amount refers a percentage of a length of the elastic substrate along the second direction after pre-stretching and a length of the elastic substrate along the second direction before pre-stretching.

The pre-stretching amount of the elastic substrate needs to be controlled within an elastic range of the elastic substrate. The pre-stretching amount of the elastic substrate can be selected according to the material of the elastic substrate and actual needs. In one embodiment, the elastic substrate is the PDMS substrate, the first pre-stretching amount and the second pre-stretching amount are both larger than or equal to 150% and less than or equal to 400%. Pre-stretching the elastic substrate by applying an external force to the elastic substrate in both the first direction and the second direction, the external force causes the elastic substrate to be elastically deformed without being damaged. In one embodiment, pre-stretching the elastic substrate by a clamp.

In step (S21), in one embodiment, adjacent super-aligned carbon nanotube films of the first plurality of super-aligned carbon nanotube films cross with each other. That is, one super-aligned carbon nanotube film in the first carbon nanotube film structure is defined as a first super-aligned carbon nanotube film, another super-aligned carbon nanotube film adjacent to the first super-aligned carbon nanotube film is defined as a second super-aligned carbon nanotube film; the carbon nanotubes in a first super-aligned carbon nanotube film cross with the carbon nanotubes in the second super-aligned carbon nanotube film. Therefore, a grid structure can be formed in the first carbon nanotube film structure. When the first carbon nanotube film structure is stretched, the first carbon nanotube film structure can absorb the stress by its own deformation, and thus the first carbon nanotube film structure is not easy to be pulled broken, and an increasing rate of resistance is slowed down. A cross angle between the carbon nanotubes of adjacent super-aligned carbon nanotube films is not limited. In one embodiment, the cross angle between the carbon nanotubes of adjacent super-aligned carbon nanotube films of the first carbon nanotube film structure is about 90 degrees.

The super-aligned carbon nanotube films can be drawn from a super-aligned carbon nanotube array. A method of drawing the super-aligned carbon nanotube film from the super-aligned carbon nanotube array comprises step (a) of selecting carbon nanotube segments with a certain width from the super-aligned carbon nanotube array and, at a certain speed, and step (b) of stretching the carbon nanotube segments to be substantially perpendicular to a growth direction of the super-aligned carbon nanotube array. Thus, the super-aligned carbon nanotube film is obtained. The super-aligned carbon nanotube array comprises a plurality of carbon nanotubes, the plurality of carbon nanotubes are substantially parallel to each other and perpendicular to a surface of a substrate. The super-aligned carbon nanotube array is pure, referring that the super-aligned carbon nanotube array is free with impurities, such as amorphous carbon, residual catalyst metal particles or the like. Embodiments of the method of making the super-aligned carbon nanotube array are taught by U.S. Pat. No. 7,045,108 to Jiang et al. The plurality of carbon nanotubes of the super-aligned carbon nanotube film joined end to end by van der Waals forces and extend in the same direction. An arranged direction of the plurality of carbon nanotubes of the super-aligned carbon nanotube film is substantially parallel to a drawing direction of the super-aligned carbon nanotube film.

Figure 3:
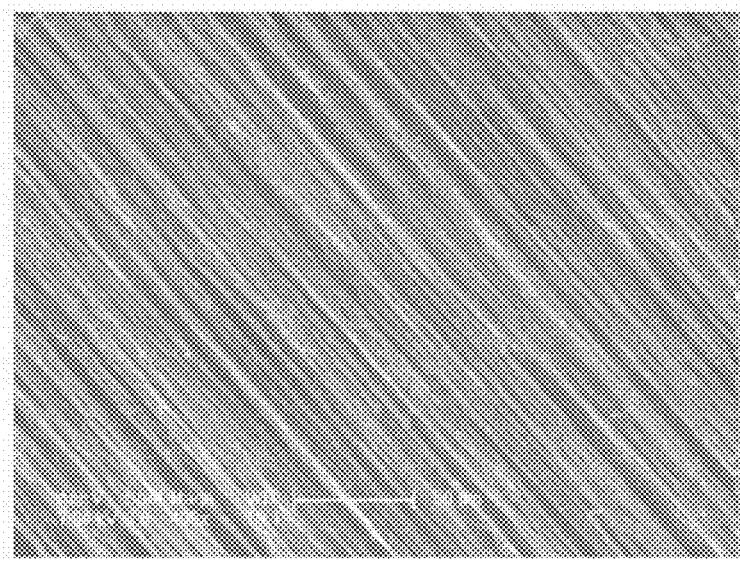
FIG. 3 is a scanning electron microscope image of one embodiment of a super-aligned carbon nanotube film.

FIG. 3 illustrates the super-aligned carbon nanotube film comprises a number of carbon nanotubes that are arranged substantially parallel to a surface of the super-aligned carbon nanotube film. A large number of the carbon nanotubes of the super-aligned carbon nanotube film can be oriented along a preferred orientation, meaning that a large number of the carbon nanotubes in the super-aligned carbon nanotube film are arranged substantially along the same direction. An end of one carbon nanotube is joined to another end of an adjacent carbon nanotube arranged substantially along the same direction, by van der Waals force, to form a free-standing film.

A minority of carbon nanotubes in the super-aligned carbon nanotube film may be randomly aligned. However, the number of randomly aligned carbon nanotubes is very small and does not affect the overall oriented alignment of the majority of carbon nanotubes in the super-aligned carbon nanotube film. The majority of the carbon nanotubes in the super-aligned carbon nanotube film substantially aligned along the same direction may not be exactly straight, and can be curved to a certain degree, or are not exactly aligned along the overall aligned direction, and can deviate from the overall aligned direction by a certain degree. Therefore, partial contacts can exist between the randomly aligned carbon nanotubes and adjacent carbon nanotubes.

In one embodiment, the super-aligned carbon nanotube film is directly laid on the surface of the pre-stretched elastic substrate after drawn from the carbon nanotube array. The method of laying the first carbon nanotube film structure on the surface of the pre-stretched elastic substrate comprises: drawing a first carbon nanotube film from a carbon nanotube array and laying the first carbon nanotube film on the surface of the pre-stretched elastic substrate; drawing a second carbon nanotube film from the carbon nanotube array and laying the second carbon nanotube film on a surface of the first carbon nanotube film, to make the second carbon nanotube film stack with the first carbon nanotube film; and repeating above steps until the first carbon nanotube film structure is obtained. In one embodiment, the first plurality of super-aligned carbon nanotube films are stacked with each other to form the first carbon nanotube film structure, and then the first carbon nanotube film structure is laid on the surface of the pre-stretched elastic substrate.

A first angle between the extending direction of the carbon nanotubes of the first carbon nanotube film structure and the first direction is not limited; a second angle between the extending direction of the carbon nanotubes of the first carbon nanotube film structure and the second direction is not limited. In one embodiment, the extending direction of the carbon nanotubes of the first carbon nanotube film structure is parallel with the first direction or the second direction.

The first carbon nanotube film structure is pure and substantially free of impurities, and thus the first carbon nanotube film structure has a large viscosity and can be fixed to the surface of the elastic substrate by its own viscosity.

In step (B22), a material of the first active material layer can be lithium ion battery cathode active material, lithium ion battery anode material or capacitor electrode active material. The lithium ion battery cathode active material can be one or more of $LiFePO_4$, $LiNi_{0.8}Co_{0.2}O_2$, $LiNi_{1/3}Co_{1/3}Mn_{1/3}O_2$, $LiCoO_2$, and $LiMn_2O_4$. The lithium ion battery anode material can be $LiTiO_2$, $Li_4Ti5O_{12}$ or graphite. The capacitor electrode active material can be activated carbon (AC), manganese dioxide, or cerium oxide.

A method of adding the electrode active material to the surface of the first carbon nanotube film structure away from the pre-stretched elastic substrate comprises: dispersing the electrode active material or the electrode active material precursor into a volatile organic solvent to form a suspension; and uniformly adding the suspension to the surface of the first carbon nanotube film structure, and forming the first active material layer after the volatile organic solvent is evaporated to no obvious droplets. In one embodiment, dispersing the electrode active material in ethanol using an ultrasonic cell crusher to obtain a suspension, and dropping the suspension on the first carbon nanotube film structure by a pipette.

A plurality of microporous can be formed by the plurality of carbon nanotubes of the first plurality of super-aligned carbon nanotube films in the first carbon nanotube film structure. When the active material particle size in the first active material layer is smaller than the size of the microporous, the first active material layer can be partially embedded in the first carbon nanotube film structure.

In step B(23), in one embodiment, adjacent super-aligned carbon nanotube films of the second plurality of super-aligned carbon nanotube films cross with each other. A cross angle between the carbon nanotubes of adjacent super-aligned carbon nanotube films of the second carbon nanotube film structure is not limited. In one embodiment, the cross angle between the carbon nanotubes of adjacent super-aligned carbon nanotube films of the second carbon nanotube film structure is about 90 degrees.

In one embodiment, step (S2) further comprises step (S24) after step (S23). Step (S24) comprises adding the electrode active material to the surface of the second carbon nanotube film structure away from the pre-stretched elastic substrate, to form a second active material layer on the surface of the second carbon nanotube film structure; and laying a third carbon nanotube film structure on a surface of the second active material layer away from the pre-elastic substrate, and the third carbon nanotube film structure comprising a third plurality of super-aligned carbon nanotube films stacked with each other; and repeating step (S24) multiple times according actual needs.

A material and adding method of the second active material layer are both the same as that of the first active material layer. In one embodiment, adjacent super-aligned carbon nanotube films of the third plurality of super-aligned carbon nanotube films cross with each other. A cross angle between the carbon nanotubes of adjacent super-aligned carbon nanotube films of the third carbon nanotube film structure is not limited. In one embodiment, the cross angle between the carbon nanotubes of adjacent super-aligned carbon nanotube films of the third carbon nanotube film structure is about 90 degrees.

In the stretchable composite electrodes, the active material layers are wrapped between the carbon nanotube film structures to form a sandwich structure. The number of super-aligned carbon nanotube films in each carbon nanotube film structure can be equal or unequal. In one embodiment, each of the number of the first plurality of super-aligned carbon nanotube films in the first carbon nanotube film structure and the number of super-aligned carbon nanotube films in the outermost carbon nanotube film structure is larger than the number of super-aligned carbon nanotube films in an internal carbon nanotube film structure. The outermost carbon nanotube film structure refers to the carbon nanotube film structure which is the farthest from the elastic substrate. The internal carbon nanotube film structure refers to the carbon nanotube film structure located between the first carbon nanotube film structure and the outermost carbon nanotube film structure. In this embodiment, the active material layer can be well carried.

In one embodiment, the step (S24) is repeated for 9 times, and the carbon nanotube active material composite layer comprises 12 carbon nanotube film structures and 11 active material layers. Each of the first carbon nanotube film structure and the outermost carbon nanotube film structure comprises 6 super-aligned carbon nanotube films. The internal carbon nanotube film structure comprises 2 super-aligned carbon nanotube films.

In step (S3), since the carbon nanotube active material composite layer is bonded to the surface of the elastic substrate, after removing the pre-stretching of the elastic substrate, a length of the elastic substrate along the first direction and a length of the elastic substrate along the second direction are shortened, and the elastic substrate returns to the original form before the pre-stretching. The plurality of carbon nanotubes of the carbon nanotube active material composite layer bend along a direction substantially perpendicular to the surface of the elastic substrate and form a number of wave shaped protuberances. Namely, some portions of the carbon nanotubes are higher than other portions of the carbon nanotubes. The carbon nanotube active material composite layer comprises a plurality of wrinkles formed by the wave shaped protuberances. When the stretchable composite electrode is stretched in any one direction or simultaneously stretched in many different directions, the plurality of wrinkles can be unfolded in the stress direction; the carbon nanotubes of the composite electrode are not broken, the integrity of the composite electrode is maintained, and thus the resistance stretchable composite electrode maintains stability when stretched by large strain. If the stress is less than or equal to the pre-stretching amount of the elastic substrate, the deformation of the plurality of wrinkles is reversible, and thus the stretchable composite electrode can be reused, and the stretchable composite electrode has well resistance stability and tensile cycle performance under large strain.

In one embodiment, further comprising step (S4) after step (S3), step (S4) comprises cutting the carbon nanotube active material composite layer on the basis of ensuring the integrity of the elastic substrate. In one embodiment, cutting the carbon nanotube active material composite layer by a laser. In one embodiment, a part of the carbon nanotube active material composite layer is reserved as an electrode tab during the cutting process.

In one embodiment, further comprising a step of removing the elastic substrate after step (B3).

Embodiment 1

In this Embodiment, a stretchable PDMS/super-aligned carbon nanotube film/Li(NiCoMn)$_{1/3}$O$_2$ composite cathode is made. A method of making the stretchable PDMS/super-aligned carbon nanotube film/Li(NiCoMn)$_{1/3}$O$_2$ composite cathode comprises step (I) of providing a rectangular PDMS substrate with a thickness of 7 mm, pre-stretching a PDMS substrate in the length direction and width direction of the PDMS substrate, and both the pre-stretching amount in the length direction and width direction are 150%. Step (II) of removing 6-layer super-aligned carbon nanotube cross films from a 75 mm×75 mm aluminum alloy frame and laying it onto the pre-stretched PDMS substrate. Step (III) of dispersing 45 mg of activated carbon powder in 60 mL of ethanol using a cell pulverizer to form a dispersion, dropping 6 mL of the dispersion on a portion of the 6-layer super-aligned carbon nanotube cross films by a pipette, the ethanol is evaporated to no obvious droplets, and a Li(NiCoMn)$_{1/3}$O$_2$ active material layer is formed. Step (IV) of covering two-layer super-aligned carbon nanotube cross films on the Li(NiCoMn)$_{1/3}$O$_2$ active material layer, and dropping 6 mL of the dispersion on the two-layer super-aligned carbon nanotube cross film by the pipette, and after the ethanol is evaporated to no obvious droplets, and the Li(NiCoMn)$_{1/3}$O$_2$ active material layer is formed, repeating step (VI) 10 times. And step (V) of covering 6-layer super-aligned carbon nanotube cross films, removing the pre-stretching of the PDMS substrate, and cutting a the super-aligned carbon nanotube film and the Li(NiCoMn)$_{1/3}$O$_2$ active material layers by a laser in the case of ensuring the integrity of the PDMS substrate. A size of the active material area is 30 millimeters multiplied by 30 millimeters.

Embodiment 2

In this Embodiment, a stretchable PDMS/super-aligned carbon nanotube film/Li$_4$Ti$_5$O$_{12}$ composite anode is made. A method of making the stretchable PDMS/super-aligned carbon nanotube film/Li$_4$Ti$_5$O$_{12}$ composite anode is the same as the method of making the stretchable PDMS/super-aligned carbon nanotube film/Li(NiCoMn)1/3O2 composite cathode in Embodiment 1. The difference between this Embodiment and the Embodiment 1 is only that the active material layer is Li$_4$Ti$_5$O$_{12}$.

Comparative Example 1

In this comparative example, a stretchable PDMS/super-aligned carbon nanotube film/Li(NiCoMn)$_{1/3}$O$_2$ composite cathode is made. The difference between the method of making the stretchable PDMS/super-aligned carbon nanotube film/Li(NiCoMn)$_{1/3}$O$_2$ composite cathode and that of Embodiment 1 is only in that the PDMS substrate in this comparative Embodiment 1 is not pre-stretched.

Comparative Example 1

In this comparative example, a stretchable PDMS/super-aligned carbon nanotube film/Li$_4$Ti$_5$O$_{12}$ composite anode is made. The difference between the method of making the stretchable PDMS/super-aligned carbon nanotube film/

Li$_4$Ti$_5$O$_{12}$ composite anode and that of Embodiment 2 is only in that the PDMS substrate in this comparative example 2 is not pre-stretched.

Figure 4:
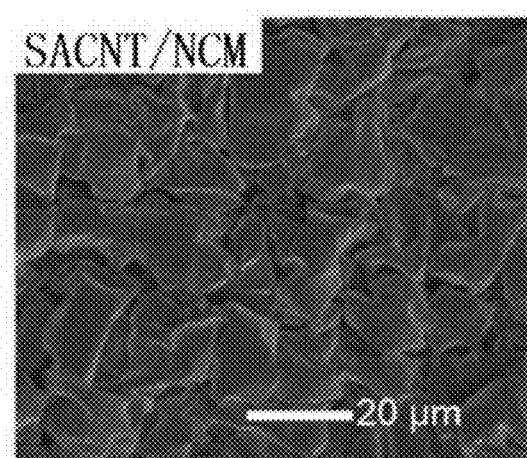
FIG. 4 shows a surface topography of a composite cathode in Embodiment 1.

FIG. 4 shows a surface topography of the composite cathode in Embodiment 1, it can be seen that a size of Li(NiCoMn)$_{1/3}$O$_2$ particles is large, and the wrinkles are mostly formed near Li(NiCoMn)$_{1/3}$O$_2$ particles.

Figure 5:
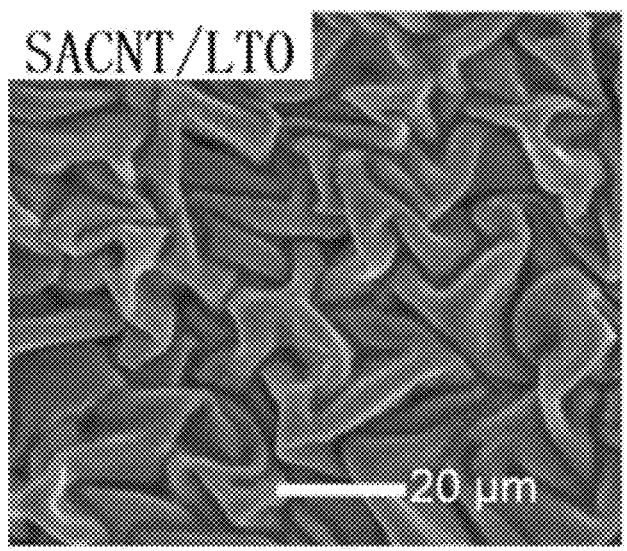
FIG. 5 shows a surface topography of a composite anode in Embodiment 2.

FIG. 5 shows a surface topography of the composite anode in Embodiment 2, a size of Li$_4$Ti$_5$O$_{12}$ nanoparticles is small, a wave shaped structure is formed on the surface of the carbon nanotube active material composite layer, and the surface of the carbon nanotube active material composite layer is in a wrinkled state and comprises a plurality of wrinkles.

Figure 6:
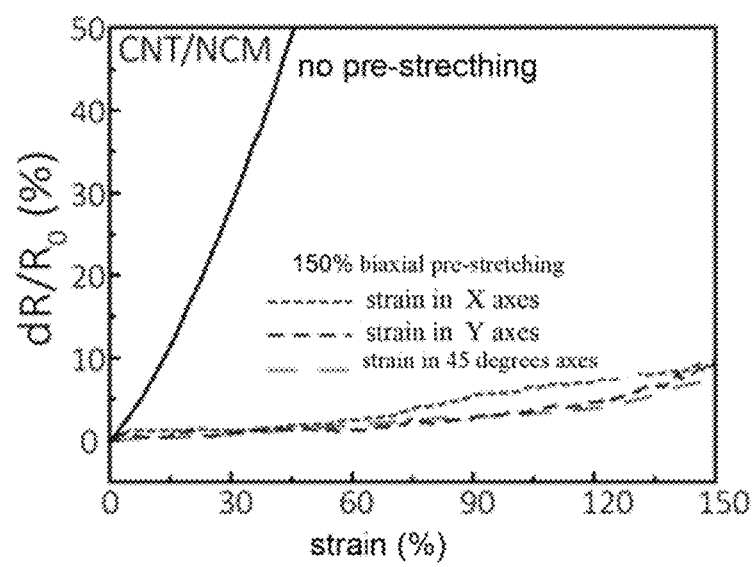
FIG. 6 is a diagram of an increase in resistance of the composite cathodes in Embodiment 1 and comparative Example 1 vs strain at different stretching directions.

Referring to FIG. 6, after the composite cathode of Embodiment 1 is stretched by 0-150% in the X, Y, and 45 degrees axes, the resistance of the composite cathode in Embodiment 1 is only slightly increased. With 150% pre-stretching, the axial resistance of the composite cathode of Embodiment 1 increased by 7.5%, 7.6%, and 7.2% at 150% strain in the X, Y, and 45 degrees axes, respectively. However, the resistance of the composite cathode without pre-stretching in comparative Example 1 increases rapidly as it was stretched along the axial direction of the carbon nanotube, the resistance increased by 50% at 40% strain. It can be seen that under 0~150% strain in different directions, the resistance stability of the stretchable composite cathode with pre-stretching is significantly better than that of the stretchable composite cathode without pre-stretching, which indicates that through the biaxial pre-stretching process, the strain-bearing ability in all directions of the stretchable composite cathode is greatly improved.

Figure 7:
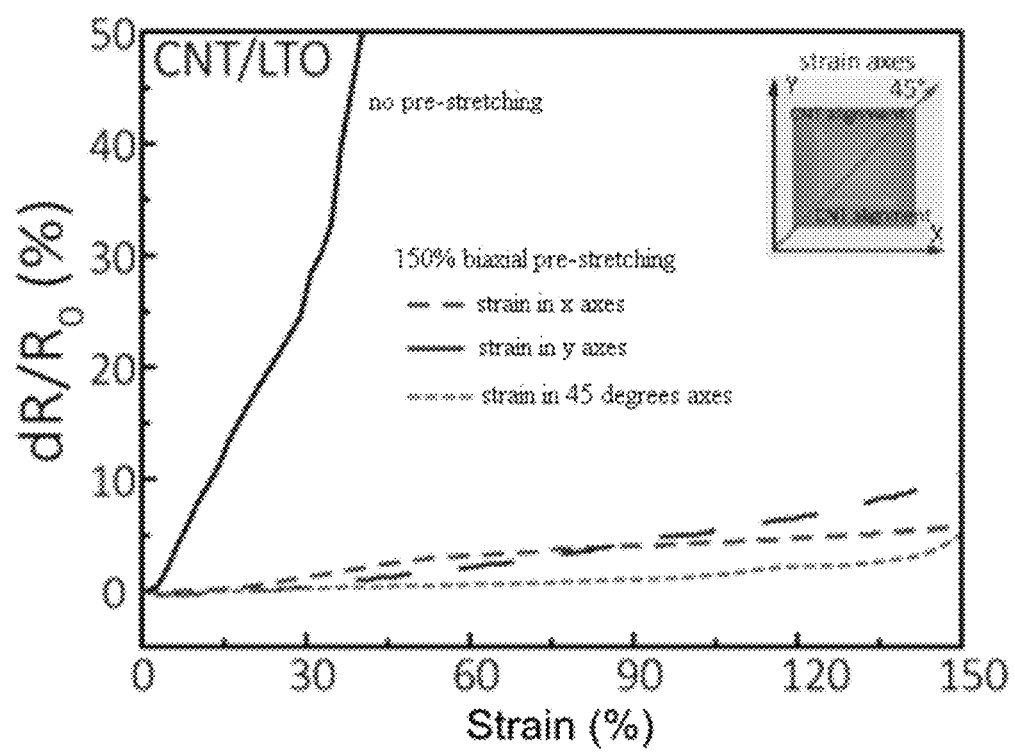
FIG. 7 is a diagram of an increase in resistance of the composite anodes in Embodiment 2 and comparative Example 2 vs strain at different stretching directions.

Referring to FIG. 7, after the composite anode of Embodiment 2 is stretched by 0-150% in the X, Y, and 45 degrees axes, the resistance of the composite anode in Embodiment 2 is only slightly increased. With 150% pre-stretching, the axial resistance of the composite anode of Embodiment 2 increased by 6%, 10.6%, and 5% at 150% strain in the X, Y, and 45 degrees axes, respectively. However, the resistance of the composite anode without pre-stretching in comparative Example 2 increases rapidly as it was stretched along the axial direction of the carbon nanotube, the resistance increased by 50% at 50% strain. It can be seen that under 0~150% strain in different directions, the resistance stability of the stretchable composite anode with pre-stretching is significantly better than that of the stretchable composite anode without pre-stretching, which indicates that through the biaxial pre-stretching process, the strain-bearing ability in all directions of the stretchable composite anode is greatly improved.

Figure 8:
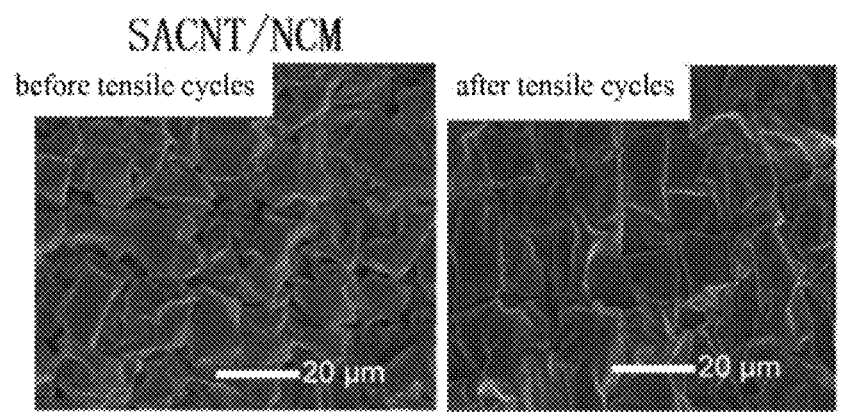
FIG. 8 shows a surface topography of the composite cathode in Embodiment 1 before and after 2000 tensile cycles in different axial directions.
Figure 9:
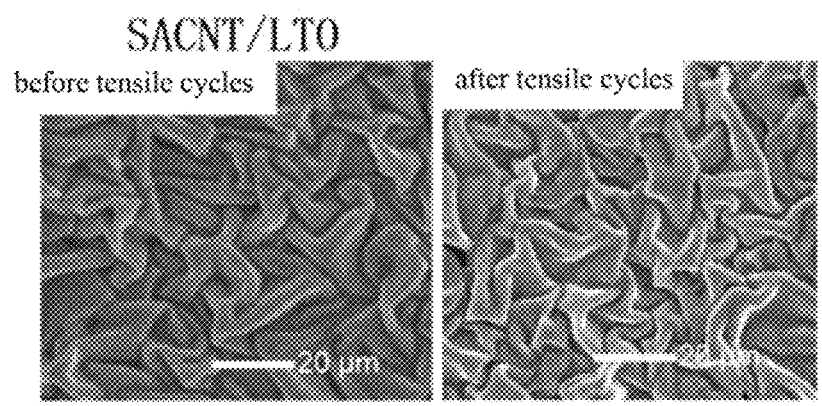
FIG. 9 shows a surface topography of the composite anode in Embodiment 2 before and after 2000 tensile cycles in different axial directions.
Figure 10:
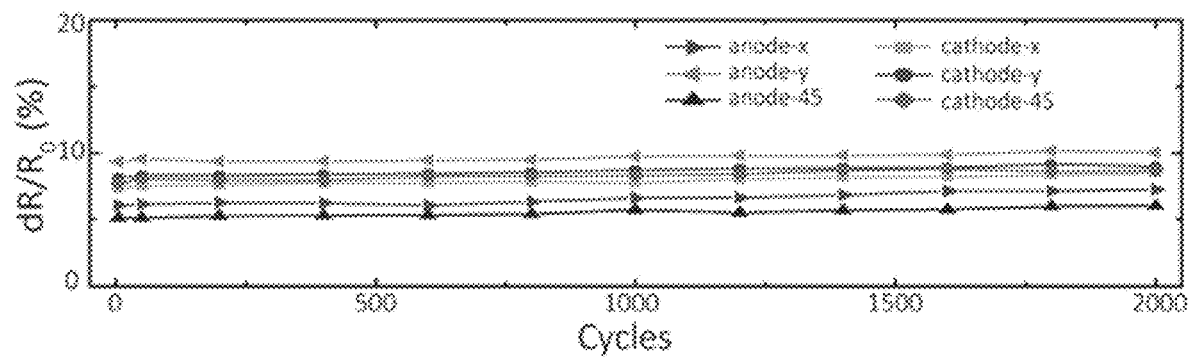
FIG. 10 shows a diagram of an increase in resistance of the composite anodes in Embodiment 1 and Embodiment 2 vs the number of stretching cycles.

FIG. 8 and FIG. 9 show that after the composite cathode of Embodiment 1 and the composite anode of Embodiment 2 are stretched 2000 times of 0~150% strain in different directions, the surface morphology of the composite cathode of Embodiment 1 and the composite anode of Embodiment 2 are similar before and after 2000 stretching cycles, and the plurality of wrinkles has almost no change. FIG. 10 shows that after the composite cathode of Embodiment 1 and the composite anode of Embodiment 2 are stretched 2000 times of 0~150% strain in different directions; the axial resistance increase of each of the composite cathode of Embodiment 1 and the composite anode of Embodiment 2 is less than 10%.

Figure 11:
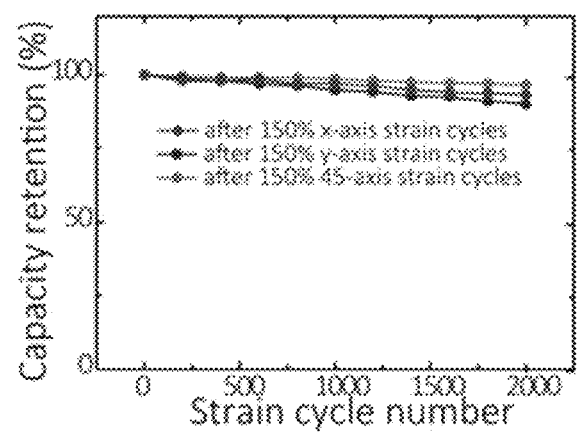
FIG. 11 shows a capacity retention of the composite anode of Embodiment 2 vs the number of stretching cycles during being stretched 2000 cycles of 0~150% strain in different directions.

Referring to FIG. 11, the composite anode of Embodiment 2 is tested with 2000 stretch cycles (0-150% strain) in different axes. After 2000 stretch cycles in the X, Y, and 45 degrees axes, the capacity retention of the composite anode of Embodiment 2 are still 92.5%, 91.8%, and 91.2% compared to their initial value. The high capacity retention demonstrates that the composite anode of Embodiment 2 has excellent resistance to repeated large strain stretching in different directions.

Figure 12:
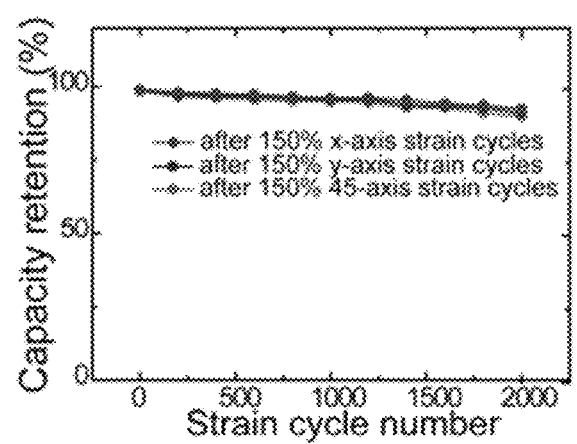
FIG. 12 shows a capacity retention of the composite cathode of Embodiment 1 vs the number of stretching cycles during being stretched 2000 cycles of 0~150% strain in different directions.

Referring to FIG. 12, after the composite cathode of Embodiment 1 is streched 2000 stretch cycles in the X, Y, and 45 degrees axes, the capacity retention of the composite cathode of Embodiment 1 are still 92.5%, 91.8%, and 91.2% compared to their initial value. The high capacity retention demonstrates that the composite cathode of Embodiment 1 has excellent resistance to repeated large strain stretching in different directions.

Figure 13:
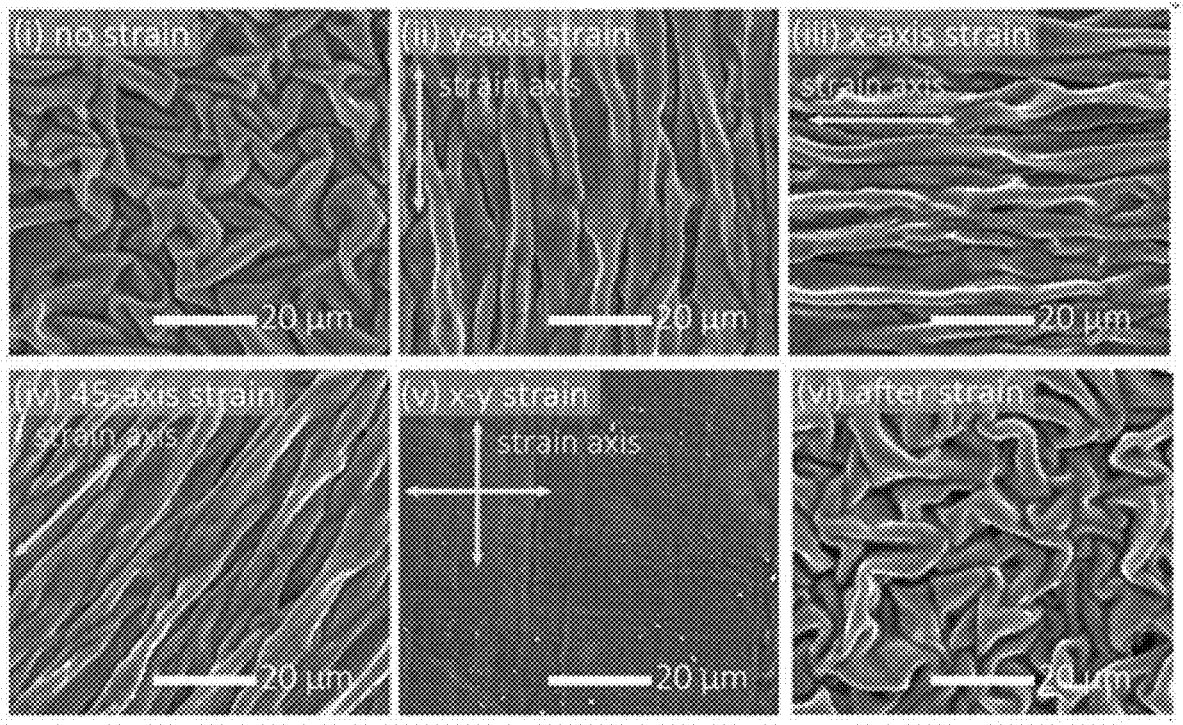
FIG. 13 is a topographical view of the composite anode of Embodiment 2 under strain in different directions.

FIG. 13 shows surface topographies of the composite anode in Embodiment 2 when stretched in different directions. It can be seen that the wrinkles on the surface of the composite anode in Embodiment 2 are unfolded in the stress direction, the carbon nanotubes in the carbon nanotube structure are not broken, and the integrity of the carbon nanotube film structure is maintained. FIG. (V) shows that when the composite anode in Embodiment 2 is stretched in two directions at the same time, the wrinkles on the surface of the composite anode in Embodiment 2 are unfolded simultaneously in the two directions of stretching, and the structure integrity of the composite anode can be maintained when the composite anode in Embodiment 2 is stretched in two directions at the same time. FIG. (vi) shows that when the stress is unloaded, a surface morphology of the carbon nanotube film structure is substantially the same as the original surface morphology of the carbon nanotube film structure. It is shown that the deformation of the wrinkles on the surface of the stretchable film structure is reversible.

Figure 14:
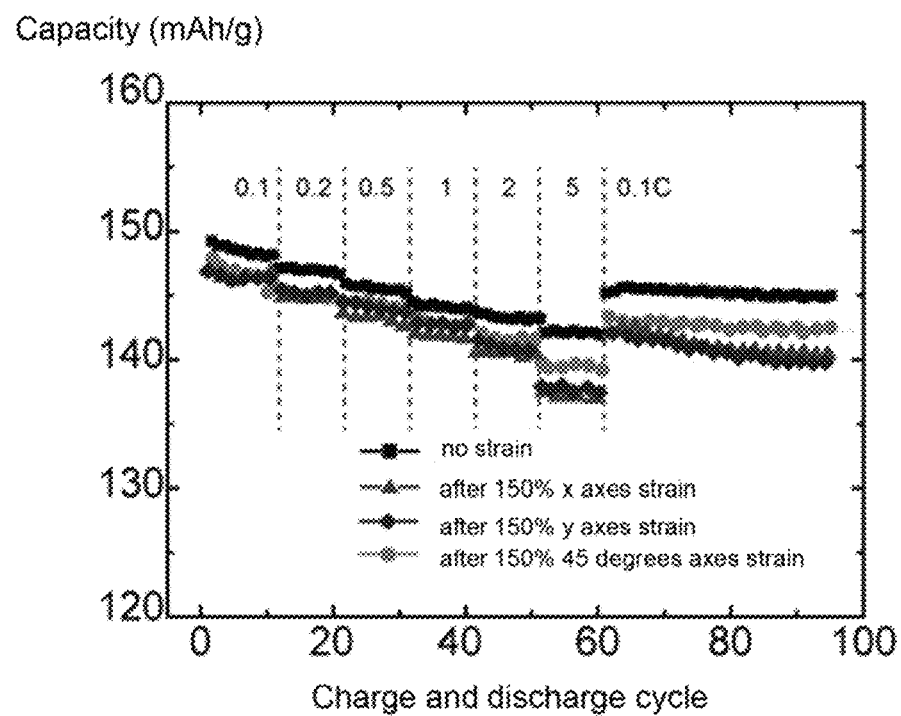
FIG. 14 shows a rate performance of the composite anode in Embodiment 2 when stretched in different directions.

FIG. 14 shows a rate performance of the composite anode in Embodiment 2 when stretched in different directions between 1.0V and 2.5V at the current density of 0.1 C, 0.2 C, 0.5 C, 1 C, 2 C, and 5 C. It can be seen that a specific capacity of the composite anode with stretching at low magnification is very close to that of the composite anode without stretching. It can also be seen that the capacity retention of the composite anode in the stretched state exceeds 96% compared with the composite anode without stretching at the current density of 5 C. Therefore, the composite anode in Embodiment 2 has excellent rate retention after stretching.

Figure 15:
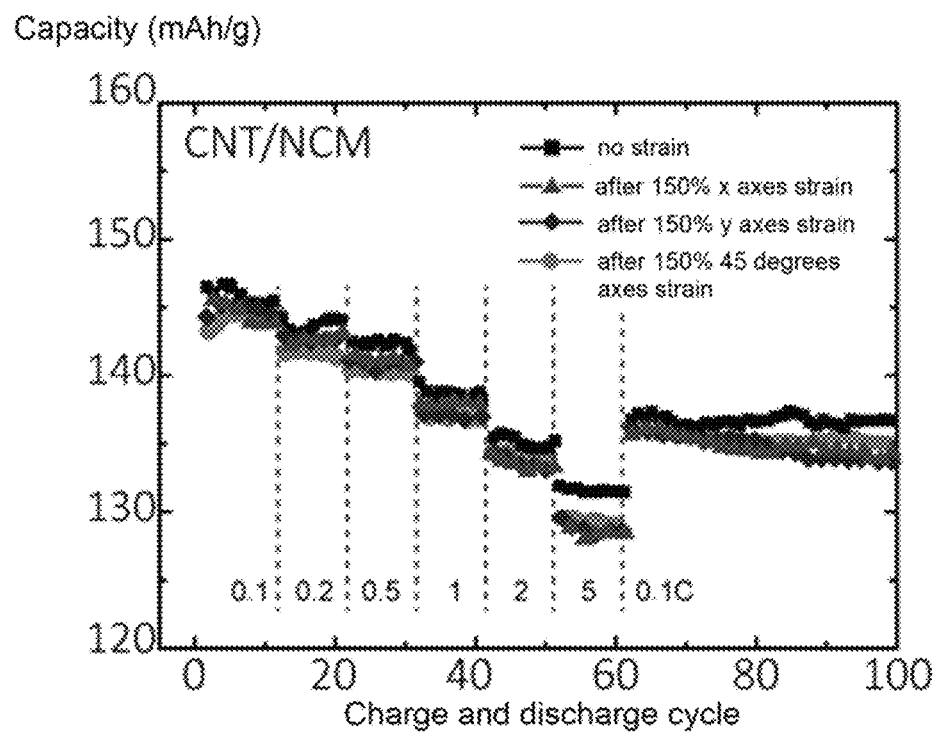
FIG. 15 shows a rate performance of the composite cathode in Embodiment 1 when stretched in different directions.

FIG. 15 shows a rate performance of the composite cathode of Embodiment 1 when stretched in different directions between 2.8V and 4.3V at the current density of 0.1 C, 0.2 C, 0.5 C, 1 C, 2 C, and 5 C. It can be seen that the capacity retention of the composite cathode under 150% strain in the X, Y, and 45° axes at 5 C are 96.9%, 97.7%, and 98.5% compared with the composite cathode without stretching. The high capacity retention demonstrates that the composite cathode of Embodiment 1 has excellent rate retention after stretching.

Figure 16:
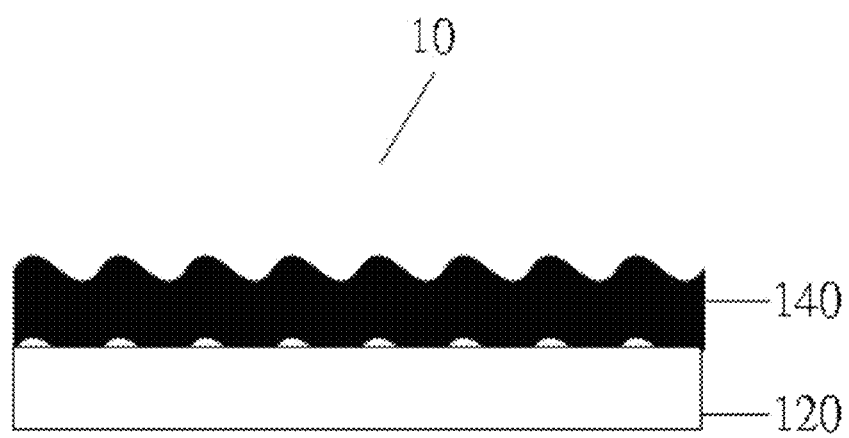
FIG. 16 is a structure schematic view of one embodiment of a stretchable composite electrode.
Figure 17:
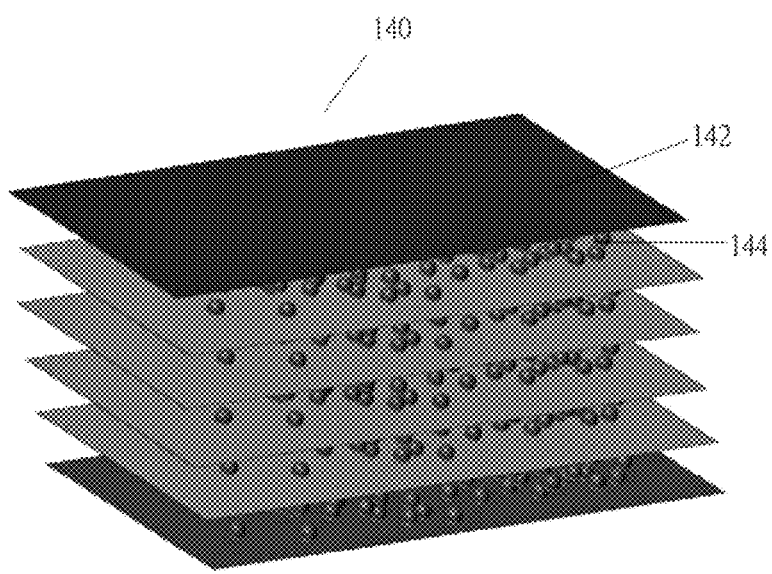
FIG. 17 is a structure schematic view of one embodiment of a carbon nanotube active material composite layer.

FIG. 16 and FIG. 17 show one embodiment of the present application in relation to a stretchable composite electrode 10 obtaining by the above method. The stretchable composite electrode 10 comprises an elastic substrate 120 and a carbon nanotube active material composite layer 140. The carbon nanotube active material composite layer 140 is located on and directly contacting with a surface of the elastic substrate 120. The carbon nanotube active material composite layer 140 comprises a plurality of carbon nanotube films structures 142 and a plurality of active material layers 144. The plurality of carbon nanotube films structures 142 and the plurality of active material layers 144 are alternated and stacked with each other. One active material layer 144 is located between adjacent carbon nanotube film structures 142, and the plurality of active material layers are wrapped by the plurality of carbon nanotube film structures to form a sandwich structure. Each of the plurality of carbon nanotube film structures 142 comprises a plurality of super-aligned carbon nanotube films stacked with each other. Each of the plurality of super-aligned carbon nanotube films comprises a plurality of carbon nanotubes substantially parallel with each other. The carbon nanotubes in adjacent super-aligned carbon nanotube films are cross with each other. A surface of the carbon nanotube active material composite layer 140 away from the elastic substrate 120 comprises a plurality of wrinkles.

A material of the elastic substrate 120 can be selected from silicone rubber, polyvinyl chloride, polytetrafluoroethylene, polyurethane (PU), polyvinyl chloride (PVC), polydimethylsiloxane (PDMS) and the like. In one embodiment, the elastic substrate 120 is a rectangular PDMS substrate with a thickness of 1 mm.

The number of super-aligned carbon nanotube films in each carbon nanotube film structure 142 can be equal or unequal. In one embodiment, each of the number of the plurality of super-aligned carbon nanotube films in the carbon nanotube film structure directly contacting with the elastic substrate 120 and the number of super-aligned carbon nanotube films in the outermost carbon nanotube film structure is larger than the number of super-aligned carbon nanotube films in an internal carbon nanotube film structure. The outermost carbon nanotube film structure refers to the carbon nanotube film structure which is the farthest from the elastic substrate. The internal carbon nanotube film structure refers to the carbon nanotube film structure located between the first carbon nanotube film structure and the outermost carbon nanotube film structure. In this embodiment, the active material layer can be well carried. In one embodiment, the carbon nanotube active material composite layer 140 comprises 12 carbon nanotube film structures and 11 active material layers; and each of the carbon nanotube film structure directly contacting with the elastic substrate 120 and the outermost carbon nanotube film structure comprises 6 super-aligned carbon nanotube films, and each internal carbon nanotube film structure comprises 2 super-aligned carbon nanotube films.

A material of the active material layer 144 can be lithium ion battery cathode active material, lithium ion battery anode material or capacitor electrode active material. The lithium ion battery cathode active material can be one or more of $LiFePO_4$, $LiNi_{0.8}Co_{0.2}O_2$, $LiNi_{1/3}Co_{1/3}Mn_{1/3}O_2$, $LiCoO_2$, $LiNiO_2$, and $LiMn_2O_4$. The lithium ion battery anode material can be $LiTiO_2$, $Li_4Ti5O_{12}$ or graphite. The capacitor electrode active material can be activated carbon (AC), manganese dioxide, or cerium oxide. In one embodiment, the material of the active material layer 144 is $LiTiO_2$.

A plurality of microporous can be formed by the plurality of super-aligned carbon nanotube films of the carbon nanotube film structure 142. When the active material particle size in the active material layer 144 is smaller than the size of the microporous, the active material layer 144 can be partially embedded in the carbon nanotube film structure 142. In one embodiment, the material of the active material layer 144 is nanoscale $LiTiO_2$ particles, and the active material layer 144 is partially embedded in the carbon nanotube film structure 142.

A surface of the carbon nanotube active material composite layer 140 comprises a plurality of wrinkles 146. The plurality of wrinkles 146 is a plurality of wave shaped protuberances formed by the carbon nanotubes of the carbon nanotube active material composite layer bending along a direction substantially perpendicular to the surface of the elastic substrate 120. Namely, some portions of the carbon nanotubes are higher than other portions of the carbon nanotube active material composite layer. When the stretchable composite electrode 10 is stretched in any one direction or simultaneously stretched in many different directions, the plurality of wrinkles 146 can be unfolded in the stress direction; the carbon nanotubes of the stretchable composite electrode 10 are not broken, the integrity of the stretchable composite electrode 10 is maintained, and thus the resistance of the stretchable composite electrode 10 maintains stability when stretched by large strain. If the stress is less than or equal to the pre-stretching amount of the elastic substrate, the deformation of the plurality of wrinkles 146 is reversible, and thus the stretchable composite electrode 10 can be reused, and the stretchable composite electrode 10 has excellent resistance stability and tensile cycle performance under large strain.

An areal density of the active substance in the active material layer 144 ranges from about 3 $mg/cm^2$ to about 8 $mg/cm^2$. In one embodiment, the areal density of the active substance in the active material layer 144 is about 5 $mg/cm^2$. A mass percentage of the active material layer 144 in the carbon nanotube active material composite layer 140 is larger than 95%.

In some embodiments, when the stretchable composite electrode 10 is applied, an angle is formed between the stretching direction and the extending direction of the carbon nanotubes of the stretchable composite electrode 10. In one embodiment, when the stretchable composite electrode 10 is applied, the angle formed between the stretching direction and the extending direction of the carbon nanotubes of the stretchable composite electrode 10 is larger than or equal to 30 degrees and less than or equal to 60 degrees. When the angle between the extending direction of the carbon nanotubes of the stretchable composite electrode 10 and the stretching direction is formed, the conductive network of the carbon nanotube layer can absorb the stress by its own deformation, and thus the stretchable composite electrode 10 is not easy to be pulled broken, and an increasing rate of resistance is slowed down.

The elastic substrate 120 can be optional. In one embodiment, the stretchable composite electrode 10 does not have the elastic substrate 120, just comprises the carbon nanotube active material composite layer 140.

Figure 18:
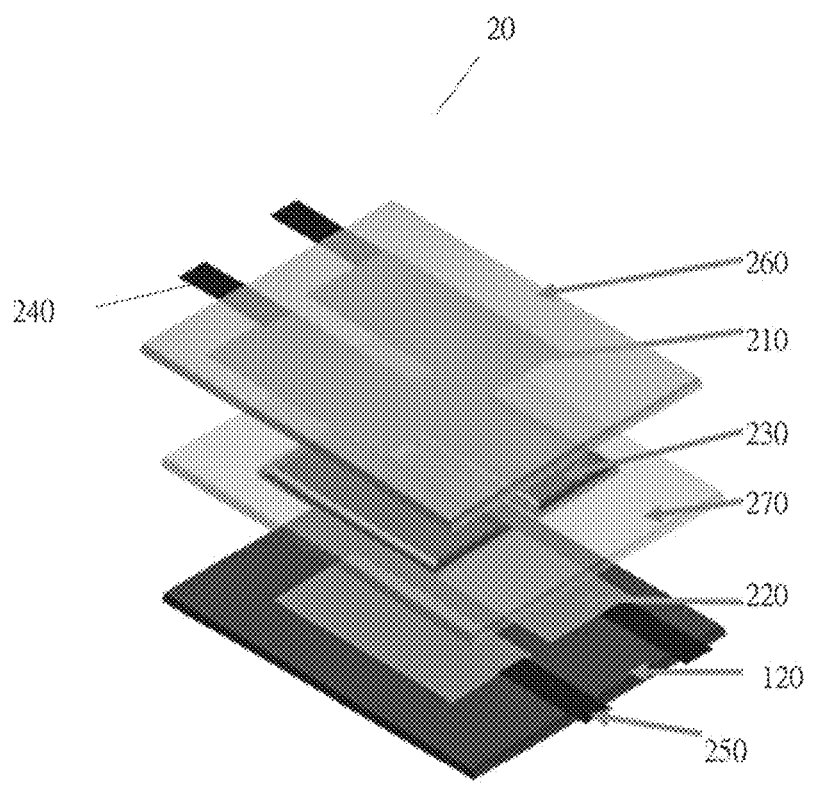
FIG. 18 is a structure schematic view of one embodiment of a stretchable lithium ion battery.

FIG. 18 shows one embodiment of the present application in relation to a stretchable lithium ion battery 20. The lithium ion battery 20 comprises a stretchable positive electrode 210, a stretchable negative electrode 220, an electrolyte 230, a positive electrode tab 240, a negative electrode tab 250, and a package structure 260. The positive electrode tab 240 comprises a first end and a second end, the first end is connected to the stretchable negative electrode 220, and the second end extends out of the package structure. The electrolyte 230 is located between the stretchable positive electrode 210 and the stretchable negative electrode 220. The package structure 260 is used to encapsulate the stretchable positive electrode 210, the stretchable negative electrode 220, and the electrolyte 230.

Each of the stretchable positive electrode 210 and the stretchable negative electrode 220 adopts the stretchable composite electrode 10. In one embodiment, a material of the active material layer of the stretchable positive electrode 210 is $LiNi_{0.8}Co_{0.2}O_2$, and a material of the active material layer of the stretchable negative electrode 220 is $LiTiO_2$.

The electrolyte 230 is gel electrolyte. In one embodiment, a method of preparing the gel electrolyte comprises: in a waterless atmosphere, dissolving 0.35 g poly (ethylene oxide) (PEO, Mw~60,000), 0.35 g uccinonitrile and 0.30 g lithium bis (trifluoromethane) sulfonimide (LiTFSi) in 50 mL mixed solvent of methylene chloride and acetone at a weight ratio of 40:1 to obtain a mixed solution, and stirring the mixed solution to a uniform gel using a magnetic stirrer.

In one embodiment, the positive electrode tab 240 and the stretchable positive electrode 210 forms an integrated molding. During making the stretchable positive electrode 210, a part of the carbon nanotube active material composite layer is reserved as the electrode tab 210 during the cutting process. The negative electrode tab 250 and the stretchable negative electrode 220 also forms an integrated molding. In other embodiment, the positive electrode tab 240 and the negative electrode tab 250 are other conductive structures, for example, graphite, copper, silver.

A material of the packaging structure 260 can be selected from any flexible material. In on embodiment, the material of the packaging structure 260 is PDMS.

A packaging method of the stretchable lithium ion battery 20 comprises: step (a) of providing a piece of PDMS film 270 with a thickness of about 0.6 mm, cutting two holes having the same size as the carbon nanotube active material composite layer of the stretchable negative electrode 220 in the PDMS film 270. Step (b) of bonding the PDMS film 270 to the stretchable negative electrode 220 using uncured PDMS, to form a groove structure exposing only a portion of the carbon nanotube active material composite layer of the stretchable negative electrode 220. Step (c) of after the uncured PDMS is cured, dropping the gel electrolyte into the groove structure, then drying the gel electrolyte at room temperature for about 24 hours, repeating the dropping and drying processes until the groove structure is filled with gel electrolyte; laminating the stretchable positive electrode 210 and the stretchable negative electrode 220 in a glove box; and exhausting and sealing by the PDMS, and the stretchable lithium ion battery 20 being obtained after the PDMS is cured.

It is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

Figure 19:
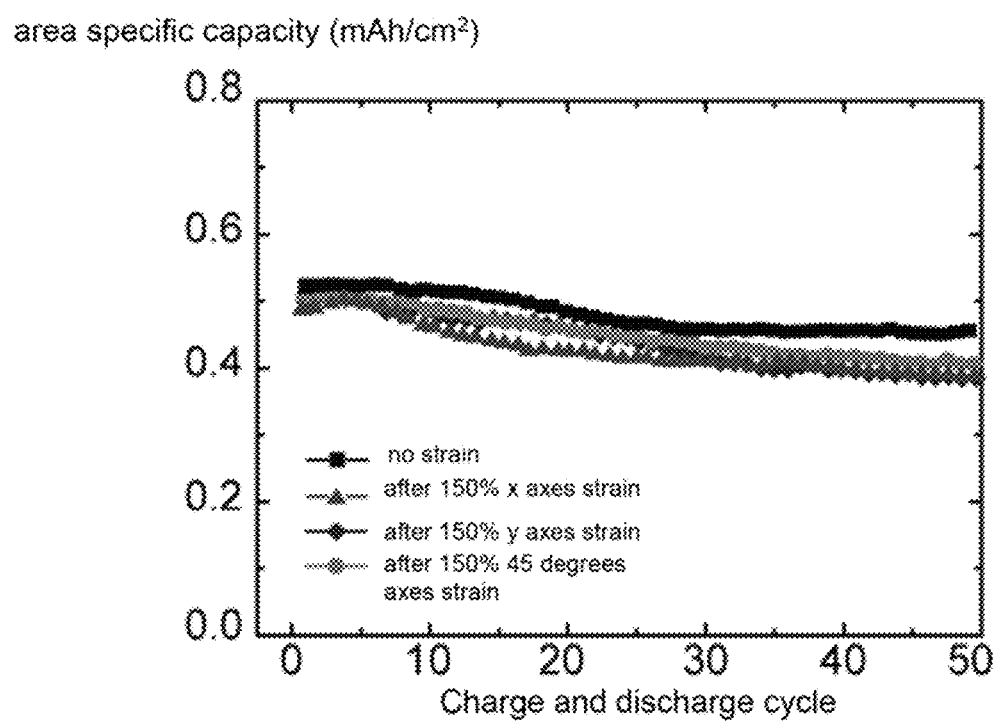
FIG. 19 shows a cycle performance curve of the stretchable lithium ion battery in FIG. 18.

FIG. 19 shows a cycle performance curve of the stretchable lithium ion battery. It can be seen that, a capacity retention rate of the stretchable lithium ion battery is 90.3% after 50 cycles of 0.1 C charge and discharge cycle. After the stretchable lithium ion battery is streched to 150% strain in the X, Y, and 45° axes, the capacity retention of the stretchable lithium ion battery are still 94.2%, 96.1%, and 96.1% compared to their initial value, and the capacity still reached 0.41 mAh/cm$^2$, 0.37 mAh/cm$^2$, 0.40 mAh/cm$^2$ after 50 cycles of 0.1 C charge and discharge cycle. It is indicated that the stretchable lithium ion battery has excellent charge and discharge cycle performance under strain in different directions.

Figure 20:
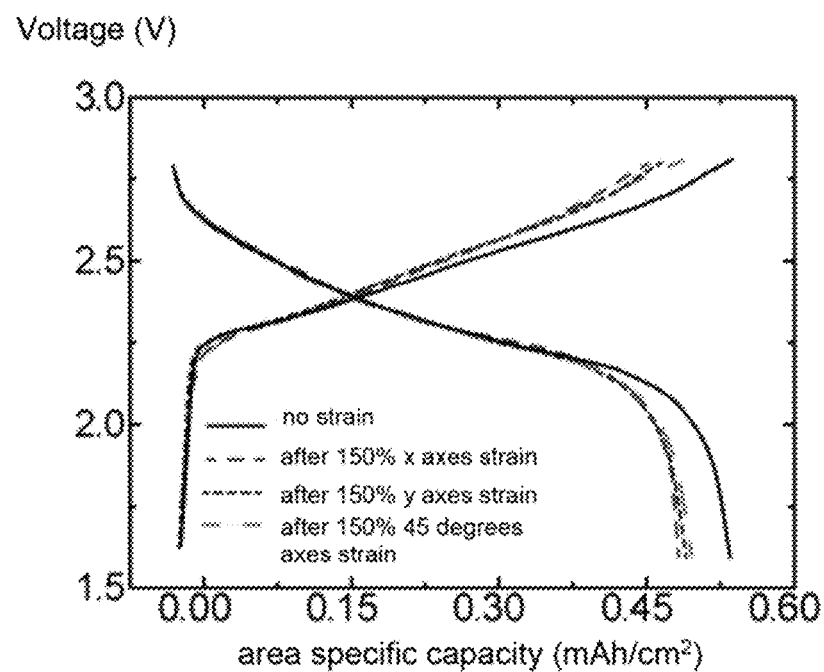
FIG. 20 shows a voltage capacity curve of the stretchable lithium ion battery in FIG. 18 before and after 2000 cycles of stretching.

Referring to FIG. 20, the stretchable lithium ion battery is tested with 2000 tensile cycles (0-150% strain) in different axes. After 2000 tensile cycles in the X, Y, and 45° axes, the specific capacity the stretchable lithium ion battery is 0.47 mAh/cm$^2$, 0.49 mAh/cm$^2$ and 0.5 mAh/cm$^2$ respectively; and the capacity retention of the stretchable lithium ion battery is 92.5%, 91.8%, and 91.2% respectively compared to their initial value. The high capacity retention demonstrates that the stretchable lithium ion battery has excellent resistance to repeated large strain stretching in different directions.

Depending on the embodiment, certain of the steps of a method described may be removed, others may be added, and the sequence of steps may be altered. The description and the claims drawn to a method may include some indication in reference to certain steps. However, the indication used is only to be viewed for identification purposes and not as a suggestion as to an order for the steps.

What is claimed is:

1. A method of making a stretchable composite electrode comprising:

step (S1): providing an elastic substrate, and pre-stretching the elastic substrate along a first direction and a second direction, to obtain a pre-stretched elastic substrate;

step (S2): laying a carbon nanotube active material composite layer on a surface of the pre-stretched elastic substrate, wherein step (S2) comprises:

step (S21): laying a first carbon nanotube film structure on the surface of the pre-stretched elastic substrate, and the first carbon nanotube film structure directly contacting with the pre-stretched elastic substrate and comprising a first plurality of carbon nanotube films stacked with each other, each of the first plurality of carbon nanotube films comprising a plurality of carbon nanotubes substantially parallel with each other;

step (S22): adding an electrode active material to a surface of the first carbon nanotube film structure away from the pre-stretched elastic substrate, to form a first active material layer on the surface of the first carbon nanotube film structure;

step (S23): laying a second carbon nanotube film structure on a surface of the first active material layer away from the pre-elastic substrate and obtaining the carbon nanotube active material composite layer on the surface of the pre-stretched elastic substrate, and the second carbon nanotube film structure directly contacting with the surface of the first active material layer and comprises a second plurality of carbon nanotube films stacked with each other;

step (S3): removing the pre-stretching of the elastic substrate along the first direction and the second direction, to restore the pre-stretched elastic substrate to the elastic substrate and form a plurality of wrinkles on a surface of the carbon nanotube active material composite layer; and step (S4): removing the elastic substrate.

2. The method of claim 1, wherein the first direction is perpendicular with the second direction.

3. The method of claim 1, wherein the elastic substrate is pre-stretched along both the first direction and the second direction.

4. The method of claim 1, wherein a plurality of microporous is formed in the first carbon nanotube film structure by the plurality of carbon nanotubes of the first plurality of carbon nanotube films.

5. The method of claim 4, wherein a particle size of the electrode active material is smaller than a size of each of the microporous, and the first active material layer is partially embedded in the first carbon nanotube film structure.

6. The method of claim 1, wherein adjacent carbon nanotube films of the first plurality of carbon nanotube films cross with each other, to form a grid structure in the first carbon nanotube film structure.

7. The method of claim 1, wherein an extending direction of the plurality of carbon nanotubes of the first carbon nanotube film structure is parallel with the first direction or the second direction.

8. The method of claim 1, wherein step (S2) further comprises step (S24) after step (S23), step (S24) comprises: adding the electrode active material to the surface of the second carbon nanotube film structure away from the pre-stretched elastic substrate, to form a second active material layer on the surface of the second carbon nanotube film structure; and laying a third carbon nanotube film structure on a surface of the second active material layer away from the pre-elastic substrate, and the third carbon nanotube film structure comprising a third plurality of carbon nanotube films stacked with each other; and repeating step (S24) multiple times.

9. The method of claim 8, wherein the step (S24) is repeated for 9 times, and the carbon nanotube active material composite layer comprises 12 carbon nanotube film structures and 11 active material layers.

10. The method of claim 8, wherein a carbon nanotube film structure farthest from the elastic substrate is defined as an outermost carbon nanotube film structure, and a carbon nanotube film structure located between the first carbon nanotube film structure and the outermost carbon nanotube film structure is defined as an internal carbon nanotube film structure; each of an amount of the first plurality of carbon nanotube films in the first carbon nanotube film structure and an amount of carbon nanotube films in the outermost carbon nanotube film structure is larger than an amount of carbon nanotube films in the internal carbon nanotube film structure.

11. The method of claim 10, wherein each of the first carbon nanotube film structure and the outermost carbon nanotube film structure comprises 6 carbon nanotube films, and the internal carbon nanotube film structure comprises 2 carbon nanotube films.

12. The method of claim 1, further comprising step (S4) after step (S3), wherein step (S4) comprises: cutting the carbon nanotube active material composite layer.

13. The method of claim 12, wherein a part of the carbon nanotube active material composite layer is reserved as an electrode tab during the step of cutting the carbon nanotube active material composite layer.

14. The method of claim 1, wherein a material of the elastic substrate is silicone rubber, polyvinyl chloride, polytetrafluoroethylene, polyurethane, polyvinyl chloride, or poly dimethylsiloxane.

15. The method of claim 1, wherein a first pre-stretching amount of the elastic substrate along the first direction is equal to a second pre-stretching amount of the elastic substrate along the second direction.

* * * * *